United States Patent [19]

Hanlon et al.

[11] Patent Number: 5,126,001
[45] Date of Patent: Jun. 30, 1992

[54] REMOVABLE RELEASE AGENT ON GLASS AND BONDING METHOD EMPLOYING SAME

[75] Inventors: James H. Hanlon, Pittsburgh; Lloyd G. Shick, Natrona Heights; Helmut Franz, Pittsburgh, all of Pa.

[73] Assignee: PPG Industries, Inc., Pittsburgh, Pa.

[21] Appl. No.: 218,432

[22] Filed: Jul. 7, 1988

Related U.S. Application Data

[63] Continuation of Ser. No. 891,098, Jul. 31, 1986, abandoned.

[51] Int. Cl.$^5$ .............................................. B32B 31/00
[52] U.S. Cl. ...................................... 156/289; 156/101; 156/267; 156/276; 427/180; 427/197; 427/198; 427/284
[58] Field of Search ......................................... 156/101

[56] References Cited

U.S. PATENT DOCUMENTS

| | | | |
|---|---|---|---|
| 2,235,516 | 3/1941 | Cornwell | 427/180 |
| 2,697,676 | 12/1954 | Black et al. | 156/276 |
| 2,725,320 | 11/1955 | Atkeson et al. | 156/276 |
| 3,329,548 | 7/1967 | Blatz | 156/289 |
| 3,454,457 | 7/1969 | Hale et al. | 156/289 |
| 3,632,841 | 1/1972 | Fortin | 264/1 |
| 3,762,981 | 10/1973 | Blank | 156/99 |
| 3,808,077 | 4/1974 | Rieser et al. | 156/102 |

*Primary Examiner*—John J. Gallagher
*Attorney, Agent, or Firm*—Donna L. Seidel

[57] ABSTRACT

A method is disclosed for providing a temporary layer of a release agent on a substrate such as glass by applying a liquid dispersion of solid particles which do not bond to the glass or form a film and evaporating the liquid to yield a layer of loosely adherent particles on the substrate surface.

10 Claims, No Drawings

REMOVABLE RELEASE AGENT ON GLASS AND BONDING METHOD EMPLOYING SAME

This application is a continuation of application Ser. No. 891,098, filed Jul. 31, 1986, now abandoned.

BACKGROUND

The present invention relates generally to the art of producing release coatings on glass substrate surfaces and more particularly to the art of producing a temporary rather than a permanent release surface on a glass substrate.

U.S. Pat. No. 3,808,077 to Rieser et al discloses fabricating bilayer safety glass by assembling a preformed plastic sheet between a glass sheet and a mold coated with a release agent. Suggested release coatings include polyvinyl fluoride, polyethylene glycol terephthalate, organopolysiloxanes and high silica content glass resins.

U.S. Pat. No. 3,632,841 to Fortin discloses a method for stretching acrylic to produce stretched acrylic having superior optical and physical properties. The method involves compressing an acrylic blank, preheated substantially isothermally to its softening temperature, between a pair of polished plates coated with lubricant. When the desired thickness is reached, the stretched acrylic is cooled to below its softening temperature before removing the pressure. Lubricant films less than 0.005 inch thick are satisfactory, and preferably the lubricant is polytetrafluoroethylene.

U.S. application Ser. No. 77,967 filed Jun. 24, 1987 teaches forming a temporary protective film on a substrate surface by applying a solution of a soluble film-forming polymer to the surface and evaporating the solvent. The film protects the surface from dirt, debris, fingerprints, roll marking, belt marks and so on during fabrication, handling and installation. Thereafter, the soluble protective film is easily washed off to provide a clean, unmarked surface. The soluble protective film is particularly useful on glass sheets.

U.S. patent application Ser. No. 98,714 filed Sep. 21, 1987 discloses providing temporary protection for a surface, as well as an interleaving material for protection and separation of adjacent surfaces, by forming a soluble polymer film on the substrate surface. The soluble polymer film may further comprise inert, insoluble spacer particles such as polyethylene or acrylic beads, as well as stain inhibitors such as adipic acid, or hydrophobic additives such as chemically reacted colloidal silica. The temporary protective film is applied to a substrate surface prior to handling, storage, shipping, installation, and so on to protect the surface from staining, scratches, dirt, fingerprints, and other contaminants. When the substrate has reached its final destination, the soluble protective film is easily removed by ordinary washing procedures.

U.S. application Ser. No. 1,717 filed Jan. 9, 1987 discloses textured release surfaces on glass substrates for use in the fabrication of plastic materials. The performance of useful release agents in the separation of plastic material from a glass substrate is improved by providing the glass substrate with a textured release surface, either by etching the glass prior to application of a release coating or by including inert solid particles of colloidal dimensions in the release film.

SUMMARY OF THE INVENTION

The present invention provides a substrate such as glass with a temporary release agent which is subsequently readily removable. In accordance with the present invention, a dispersion of fine particles such as polyethylene and/or polytetrafluoroethylene in a volatile solvent such as isopropanol is applied to the substrate surface in the area where release properties are desired. No film-forming material is required. The solvent quickly evaporates leaving a loosely adherent layer of release agent fine particles on the surface. This layer of fine particles of release agent is easily removed by wiping or rinsing. In a preferred use of the temporary release agent of the present invention, an alcohol suspension of a blend of micron-sized particles of polyethylene and polytetrafluoro- ethylene is applied onto a predesignated area of a glass substrate. A polymeric layer is then laminated to the glass. The polymer bonds to the glass surface except in the area where the temporary release agent of the present invention has been applied. In that area the polymer is not bonded and may be readily removed from the glass. The polymer particles of the temporary release agent of the present invention adhere to the polymer layer of the laminate and are removed with the portion of the polymer which is removed from the laminate leaving an exposed glass surface area which is ready for further fabrication. Since the release agent is removed along with the portion of the polymer layer which is trimmed from the laminate, the newly exposed glass surface area no longer has release properties and may be immediately processed, e.g., by applying adhesive for installation.

DESCRIPTION OF THE PREFERRED EMBODIMENTS

The temporary release agent of the present invention is particularly useful on a portion of a glass substrate which is to be laminated with a polymer layer to form a safety glass windshield from which a portion of the polymer layer must be removed to expose the perimeter portion of the glass layer for further fabrication. The portion treated with the temporary release agent of the present invention may be a perimeter portion of the laminate from which a strip of the polymer layer is removed to expose the glass perimeter for further fabrication, such as applying adhesive for installation. In other embodiments the treated portion may be a small spot in the central portion of the laminate from which a portion of the polymer layer is removed to expose the glass surface for application of a rear view mirror button or inspection sticker.

In a preferred embodiment of the present invention, a glass substrate, cleaned as necessary, is contacted about a perimeter portion of the surface area to be laminated with a dispersion of fine particles in a volatile solvent. The fine particles are preferably in the micron-size range, typically less than 15 microns, most preferably with an average particle size between 1 and 10 microns. Preferred particles are inert polymer particles which are not permanently bonded to the glass surface, and most preferably those which will adhere more strongly to the polymer layer than to the glass surface. Hydrocarbon and fluorocarbon polymer particles are useful in accordance with the present invention, particularly polyethylene and polytetrafluoroethylene, and most preferably a blend of polyethylene and polytetrafluoroethylene.

While the concentration of particles in the liquid carrier is not critical, concentrations of about 1 to 10 grams per 100 milliliters are preferred to facilitate application and drying. The dispersion preferably further comprises a wetting agent to ensure complete wetting of the glass surface. Various wetting agents are suitable; Zonyl FSN surfactant from Dupont is preferred. Typically a drop of wetting agent per 100 milliliters of dispersion is sufficient.

Since it is not necessary for the particles to actually dissolve, the term solvent is used herein to describe any suitable dispersant liquid which may be used in accordance with the present invention. Volatile solvents are preferred for quick drying and to avoid leaving any residue on the glass surface. Low molecular weight alcohols are preferred as inexpensive, safe, clean carrier liquids. Isopropanol is a particularly preferred solvent.

The polymer particles of the present invention are not film-formers. They do not dissolve in the carrier liquid, but rather remain as inert solid particles applied to the substrate surface from dispersion in the carrier liquid. Upon evaporation of the solvent, the substrate surface bears a loosely adherent layer of inert polymer particles, not a film.

In a preferred embodiment of making laminated safety glass in accordance with the present invention, the dispersion of fine particles is preferably applied to a perimeter portion about 15 millimeters wide around the surface of the glass substrate to be laminated. The dispersion may be applied by spraying, brushing, dipping or any conventional means. A preferred method of application is by means of a pad of appropriate width such as is commonly used in painting. A layer of polymer such as polyurethane or polyvinylbutyral is assembled against the glass substrate over both the treated and untreated surface areas. The glass-plastic assembly is then subjected to sufficient conditions of temperature and/or pressure to bond the plastic to the glass surface to form a safety glass laminate.

Since the perimeter portion of the glass must be exposed for further fabrication, a perimeter portion of the plastic layer must be removed. Prior to the present invention, cutting and extensive scraping with razor blades was required to remove a perimeter portion of the polymer layer from a perimeter area of the glass surface. However, in accordance with the present invention, it is necessary only to cut through the polymer layer along the border between the treated and untreated glass surface areas. Then the perimeter portion of the polymer layer to be removed may be simply peeled from the treated perimeter area of the glass surface. The temporary release layer of fine particles adheres to the perimeter portion of the polymer layer which is removed, thus yielding a clean glass perimeter surface ready for further processing. As the newly exposed glass surface area no longer has release properties, it is immediately ready for fabrication, such as application of adhesives for installation.

The present invention will be further understood from the descriptions of examples which follow.

EXAMPLE I

A dispersion is prepared comprising polyethylene and polytetrafluoroethylene particles in 2-propanol. The particles have an average size of 3.5 microns and are available from Micro Powders, Inc., under the tradename Polysilk 14. A dispersion comprising four grams of particles per 100 milliliters of solvent is applied in a stripe one inch wide about the perimeter of a surface of a glass sheet. A layer of polyvinylbutyral is then placed against the glass sheet covering both the treated and untreated surface areas of the glass sheet. The glass-vinyl assembly is then subjected to laminating conditions of 300° F. (about 149° C.) at 200 pounds per square inch for one hour. After the laminate is cooled to ambient temperature, the vinyl layer is cut through one inch in from the edge around the perimeter of the laminate. The perimeter portion of the vinyl layer is easily removed from the underlying treated surface area of the glass substrate, leaving no residue on the glass surface.

EXAMPLE II

Glass sheets are treated as in Example I except that the dispersion comprises two grams of particles per 100 milliliters of propanol. Vinyl is laminated to the glass as in Example I. The edge portion of the vinyl is trimmed from the laminate as in Example I, again easily removed with no residue on the glass surface.

EXAMPLE III

Glass sheets are treated as in the previous Examples except that the dispersion comprises only one gram of particles per 100 milliliters of propanol. Vinyl is laminated to the glass as in the previous Examples, and the edge portion of the vinyl subsequently trimmed, again easily removed with no residue on the glass surface.

The above examples are offered to illustrate the present invention. Other particulate materials may be used in dispersion in a wide variety of conventional solvents. The particle size and the concentration of particles may vary over a wide range. The dispersion may comprise any suitable wetting agent or other additive to facilitate its use. Any method of application is acceptable, and the dispersion may be applied to either the glass or the polymer. Various polymer layers may be laminated under a range of laminating conditions which are not critical to the invention. The scope of the present invention is defined by the following claims.

We claim:

1. In a method of laminating a polymer layer to a glass substrate, wherein a portion of said polymer layer is subsequently removed from said glass substrate, the improvement which comprises applying at the interface between the glass substrate and said polymer layer at said portion a liquid dispersion of solid inert polymer particles which do not bond with said glass surface and evaporating the liquid to form a layer of inert polymer particles between the glass and the polymer layer prior to subjecting said glass and polymer layer to laminating conditions whereby said particles adhere to and are subsequently removed with said portion of said polymer layer.

2. A method according to claim 1 wherein said particles comprise particles selected from the group consisting of polyethylene particles, polytetrafluoroethylene particles and mixtures thereof.

3. A method according to claim 2 wherein said particles have an average particle size between about 1 and 10 microns.

4. A method according to claim 3 wherein said particles are dispersed in a volatile organic solvent.

5. A method according to claim 4, wherein said solvent comprises a low molecular weight alcohol.

6. A method according to claim 5, wherein said solvent comprises 2-propanol.

7. A method according to claim 6 wherein said dispersion comprises about 1 to 10 grams of particles per 100 milliliters of solvent.

8. A method according to claim 7 wherein said dispersion further comprises a wetting agent.

9. A method according to claim 1, wherein said dispersion is applied to said glass substrate.

10. A method according to claim 1, wherein said dispersion is applied to said polymer layer.

* * * * *